Figure 2:
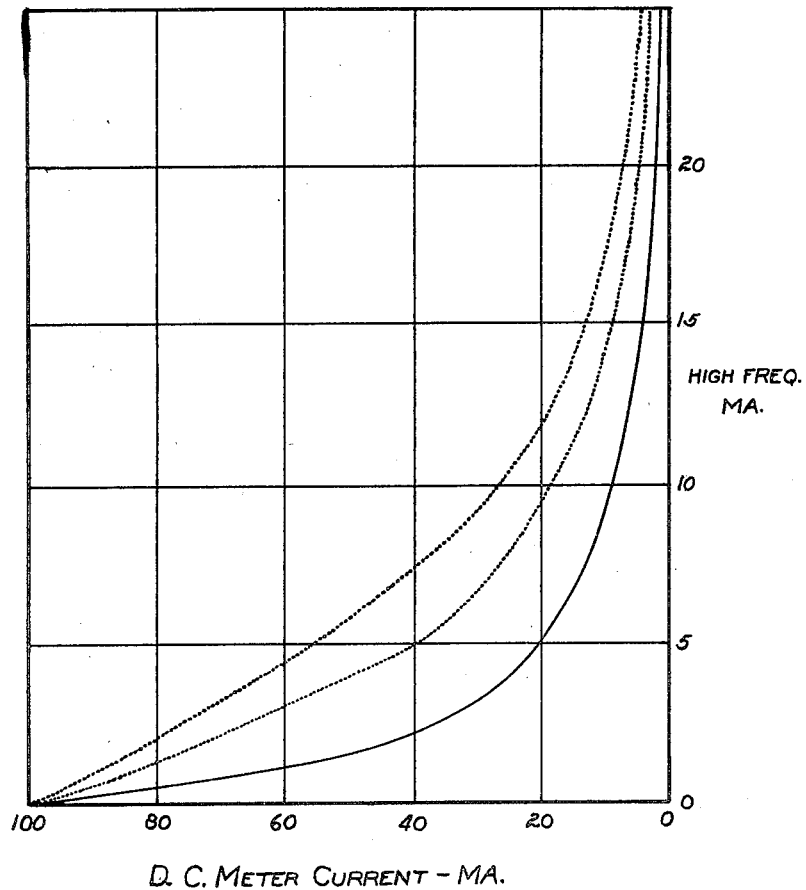

Dec. 12, 1950     O. H. SCHMITT     2,533,289

THERMISTOR HIGH-FREQUENCY AMMETER

Filed Aug. 1, 1946

INVENTOR.
OTTO H. SCHMITT
BY Paul, Paul & Moore
ATTORNEYS

Patented Dec. 12, 1950

2,533,289

UNITED STATES PATENT OFFICE 2,533,289

THERMISTOR HIGH-FREQUENCY AMMETER

Otto H. Schmitt, Mineola, N. Y., assignor to Regents of the University of Minnesota, Minneapolis, Minn., a corporation of Minnesota Application August 1, 1946, Serial No. 687,654

4 Claims. (Cl. 171—95)

This invention relates to a new type of high-frequency meter.

The conventional hot-wire ammeter and thermo-couple ammeter characteristically have compressed scales for low readings and expanded scales toward their upper limits. As a result, in adjusting radio-frequency circuits where low values within the meter range should be critically observed, a single current-squared ammeter is of limited utility. Furthermore, the current-squared type of ammeter has an abrupt maximum current limit. When used by students and others of limited experience, frequent costly burnouts may be expected.

It is, therefore, an object of this invention to avoid some or all of these difficulties by providing an improved type of A.-C. meter, primarily useful for current measurement and for radio frequencies but not limited thereto. According to this invention, the radio-frequency current to be measured is passed through a thermistor, a relatively new circuit component, the resistance of which varies appreciably with temperature. A resistance measuring circuit is then used for measuring the resistance of the thermistor and this measurement is accordingly indicative of the value of the radio-frequency input. The system operates preferably on direct current which is preferably low enough to avoid appreciable heating of the thermistor element. I have found that by using a thermistor having a negative thermal coefficient of resistance, and in some instances resistors having a positive coefficient of resistance, notable advantages are obtained. A more complete understanding of the invention will be gained from the following detailed illustrative embodiments.

Figure 1:
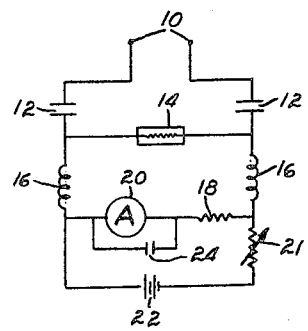

In the drawings:

Figure 1 is a wiring diagram of a high-frequency ammeter circuit embodying a thermistor; and Figure 2 is a group of curves of direct-current meter readings plotted against high-frequency current input to the thermistor.

A thermistor is a conductor or semiconductor the resistance of which varies appreciably with changes in temperature. Some thermistors double in resistance for approximately every 18° C. decrease in temperature. A discussion of the characteristics of thermistors is given in the article by G. L. Pearson in the "Bell Laboratories Record" of December 1940, at page 106. Bell Telephone Laboratories thermistor type D-159247 is used in the following illustrative embodiment of high-frequency milliammeter.

Referring to Figure 1, a standard resistance-measuring circuit, somewhat modified, is connected across the temperature variable resistor, or specifically, thermistor 14. That resistance-measuring circuit includes a voltage source 22 and a resistor 21 connected to one of its terminals, the remaining resistor and voltage-source terminals being connected to a first series circuit comprising resistor 18 and microammeter 20 and to a second series circuit comprising thermistor 14 between two radio frequency chokes 16. Element 14 is also connected at each of its terminals to a blocking capacitor 12, which capacitors in turn are connected to input terminals 10.

In operation, the radio frequency circuit (or the like) under investigation is appropriately connected to terminals 10. The manner of connection depends upon whether current, voltage or wattage is to be read, as is well known. Heating of the element 14, which may for example be a thermistor, due to the radio frequency current passed by capacitors 12 decreases its resistance and allows a greater portion of the D.-C. current passed by resistor 21 to be shunted away from the path through meter 20. The resistance of the element 14 and D.-C. meter paths in parallel is made small by comparison with resistor 21. The total current supplied to both paths is largely unaffected by changes in resistance of element 14.

The meter 20 is calibrated directly in alternating current values. It is sometimes expedient to readjust the meter springs to bring the pointer to the opposite end of the scale from normal "0" and to reverse the direct current connections from those normally used. This procedure results in increased alternating current values reading from left to right. Resistor 21 is then used to locate the pointer at the zero end of the scale when no radio frequency current is flowing.

Capacitors 12 block the direct current from power supply 22 from entering the radio frequency circuit being measured, and prevent any direct current or low frequencies of alternating current, in the circuit being tested, from passing through thermistor 14 or meter 20. Chokes 16 block the flow of radio frequency currents from flowing through meter 20 and resistance 18 and channel such currents through thermistor 14, and protect the other components of the system from possible damage by radio frequency currents. Capacitor 24 shunts meter 20 as a further safeguard against the flow of any stray radio frequency currents therethrough. There is mutual isolation from direct currents and voltages between the instrument and the circuit under investigation, and the radio frequency current drawn by the instrument is held to a minimum. Consequently, the meter 20 and power supply 22 may be grounded safely for protection of the operator, yet input terminals 10 may be connected above ground in respect to direct and radio frequency potentials in the circuit under investigation.

The ratio of direct current resistances of the meter and thermistor branches of the circuit as well as thermistor design determines the range of high-frequency currents that may be measured on the linear part of the scale. To obtain the solid line curve in Figure 2, a 0 to 100 microammeter having 2250 ohms of internal resistance was used in series with resistor 18 of 20,000 ohms, resistor 21 was 32,500 ohms, capacitors 12 were merely for blocking direct current, capacitor 24 was a 1.0-microfarad by-pass condenser. The direct current supply was a 6-volt battery.

The adjustment of this type of instrument for a particular thermistor, particular ambient temperature, and a given battery voltage should, strictly speaking, be accomplished by selecting or adjusting resistor 18 so that the ratio of the thermistor resistance to the sum of resistor 78 and the internal meter resistance has a specified value, and then adjusting resistor 21 so that the meter provides full-scale deflection when no high-frequency current flows. In practice, it is sufficient to make the first adjustment only once, and then compensate both for ambient temperature and battery variation by adjusting resistor 21. The value of resistor 21 does not affect the scale of the instrument with the above adjustments unless the battery voltage is low, so as to make resistor 21 comparable with the thermistor and resistor 18 in parallel. Since the direct-current range for this type of instrument is of the order of one milliampere or less, it is usually economical to use ample voltage, especially if the meter is not in constant use.

Multiple radio frequency scales may be provided if desired, without changing the meter, the thermistor or the voltage source. This is accomplished by substituting new values of resistance for resistor 18 and concurrently substituting other resistors 21 to give full-scale deflection at zero radio frequency input. When this is done the relatively linear portion of the characteristic may be arranged to cover various radio frequency current ranges. This is illustrated in the dotted curves of Figure 2. Approximately 60 per cent of the meter scale is linear for these ranges, the higher radio frequency currents beyond the linear-scale portions being nevertheless within the range of the instrument. The meter is protected in the case of excessive radio frequency currents, but is sensitive to low A.-C. currents. The thermistor is largely self-protecting due to its negative temperature coefficient of resistance.

As many apparently widely different embodiments of this invention may be made without departing from the spirit and scope thereof, it is to be understood that I do not limit myself to the specific embodiments herein except as defined by the appended claims.

What I claim is:

1. A system of alternating current measurements, a first circuit consisting of condenser means and temperature variable resistance means connected in series for conducting the alternating current therethrough, and a circuit in parallel with only the temperature variable resistance means including an inductance for blocking the flow of alternating current through said parallel circuit, a first resistor and a direct current meter all connected in series and a source of direct current having a second resistor in series therewith connected across the portion of said parallel circuit which includes the meter and said first resistor.

2. A high frequency alternating current measuring system comprising a first alternating current terminal, first condenser, first inductance, a direct current source, a first resistor, second inductance, second condenser and second alternating current terminal connected in series, temperature variable resistance means connected between the junction of the first condenser and first inductance and the junction of the second condenser and second inductance, and a meter having a second resistor in series therewith connected between the junction of the first inductance and battery and the junction of the first resistor and second inductance.

3. The apparatus of claim 2 further characterized in that the first resistor is variable.

4. The apparatus of claim 2 further characterized in that the meter is shunted by a third condenser.

OTTO H. SCHMITT.

REFERENCES CITED

The following references are of record in the file of this patent:

UNITED STATES PATENTS

| Number | Name | Date |
|---|---|---|
| 1,039,925 | Cati | Oct. 1, 1912 |
| 1,396,350 | Wilson | Nov. 8, 1921 |